(12) United States Patent
Nojima

(10) Patent No.: US 6,301,604 B1
(45) Date of Patent: Oct. 9, 2001

(54) MULTIMEDIA SERVER

(75) Inventor: Shinji Nojima, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/201,123

(22) Filed: Nov. 30, 1998

(30) Foreign Application Priority Data

Dec. 1, 1997 (JP) .................................................... 9-329966

(51) Int. Cl.⁷ ......................................................... G06F 9/00
(52) U.S. Cl. .......................... 709/108; 710/117; 710/124
(58) Field of Search .................................... 709/104, 108, 709/231, 101, 102, 106; 710/7, 20, 52, 56, 129, 8, 13, 101, 124, 128, 107, 117; 707/10, 30, 520; 712/38; 711/212

(56) References Cited

U.S. PATENT DOCUMENTS

| | | |
|---|---|---|
| 5,164,938 | 11/1992 | Jurkevich et al. . |
| 5,490,272 | 2/1996 | Mathis et al. ........................ 709/108 |
| 5,533,205 * | 7/1996 | Blackledge . |
| 5,729,526 * | 3/1998 | Makoto ................................ 370/206 |
| 5,745,642 * | 4/1998 | Ahn ........................................ 386/95 |
| 5,802,391 * | 9/1998 | Hwang ..................................... 710/2 |
| 5,809,261 | 9/1998 | Lembrecht ........................... 710/128 |
| 5,812,844 | 9/1998 | Jones et al. ........................... 709/104 |
| 5,872,942 | 2/1999 | Swanstrom et al. ................. 710/129 |
| 5,940,610 * | 8/1999 | Baker et al. ......................... 713/600 |
| 5,951,664 | 9/1999 | Lambrecht et al. ................. 710/124 |
| 6,145,025 * | 11/2000 | Lim ....................................... 710/22 |

* cited by examiner

Primary Examiner—Majid A. Banankhah
(74) Attorney, Agent, or Firm—Lowe Hauptman Gilman & Berner, LLP

(57) ABSTRACT

Multimedia applications including a video and an audio are transmitted at respective adapted transfer rates in a server connected with a networks. The server operates on an operating system which permits a multithreading by allocating time slices to thread. For each application, data on a required transfer rate indicative of a permitted lowest transfer rate for the application is prepared. Threads are generated for respective applications. An initial number of slices are allocated to each thread to let said threads transmit said respective applications. A transfer rate of each thread is measured at a time interval. A number of slices to be allocated to each thread is calculated such that the measured transfer rate of each thread (i.e., each application) becomes equal to the required transfer rate of the application transmitted by the thread.

10 Claims, 19 Drawing Sheets

| APPLICATION ID | REQUIRED TRANSFER RATE (Kbps) | PRIORITY |
|---|---|---|
| M1 | 10 | 0 |
| M2 | 5 | 0 |
| M3 | 10 | 10 KBPS |
| ⋮ | ⋮ | ⋮ |
| MIDi | RTRi | |
| ⋮ | ⋮ | ⋮ |

270

NORMAL SLICE ALLOCATION OPERATION

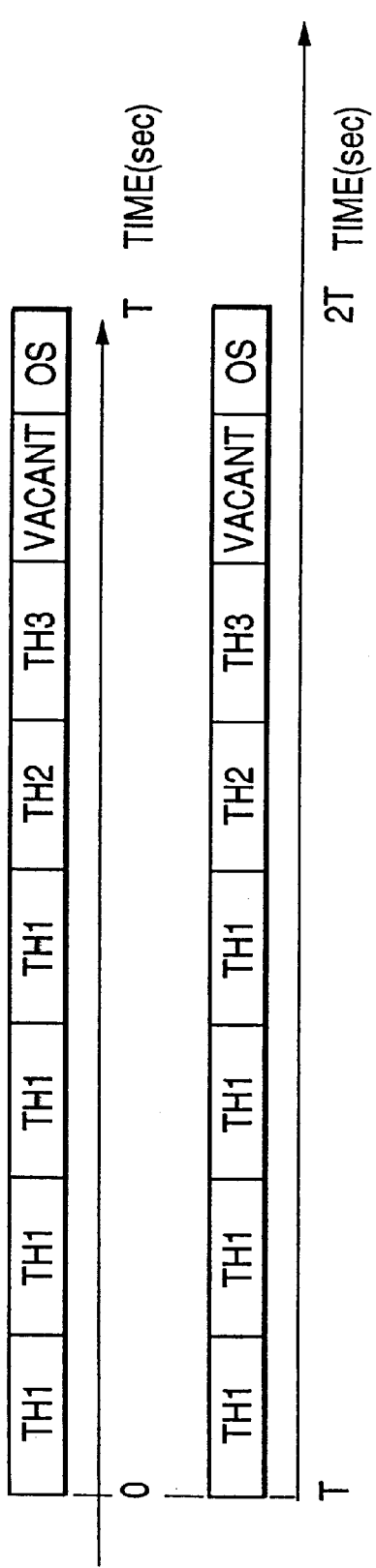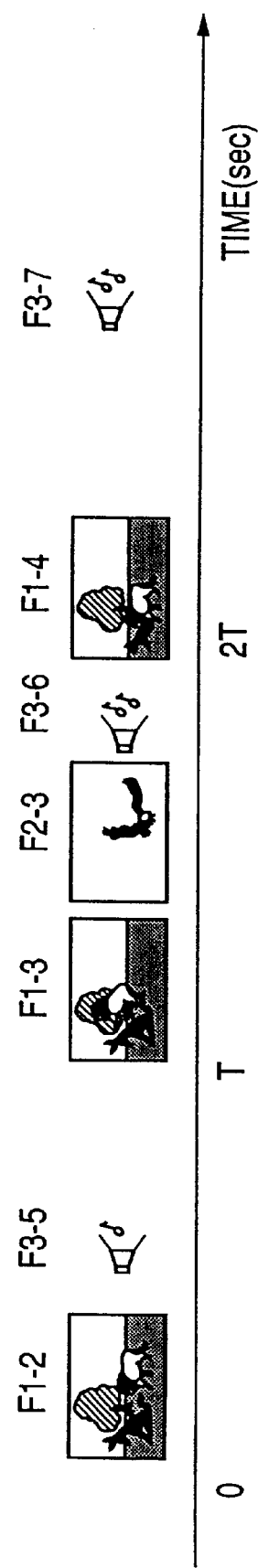
FIG. 11
FIG. 12

FIG. 20
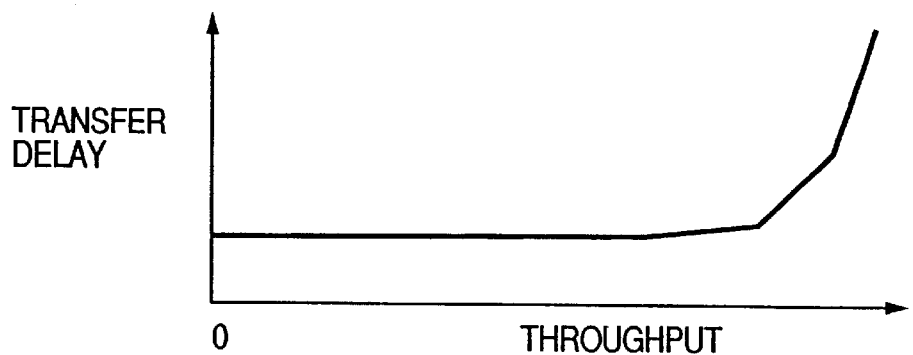
FIG. 21
| THROUGHPUT (Kbps) | TRANSFER RATE RATIO (%) THAT ENABLES LOW DELAY TRANSMISSION |
|---|---|
| 0~10 | 100 |
| 10~50 | 85 |
| MORE THAN 50 | 50 |
FIG. 22
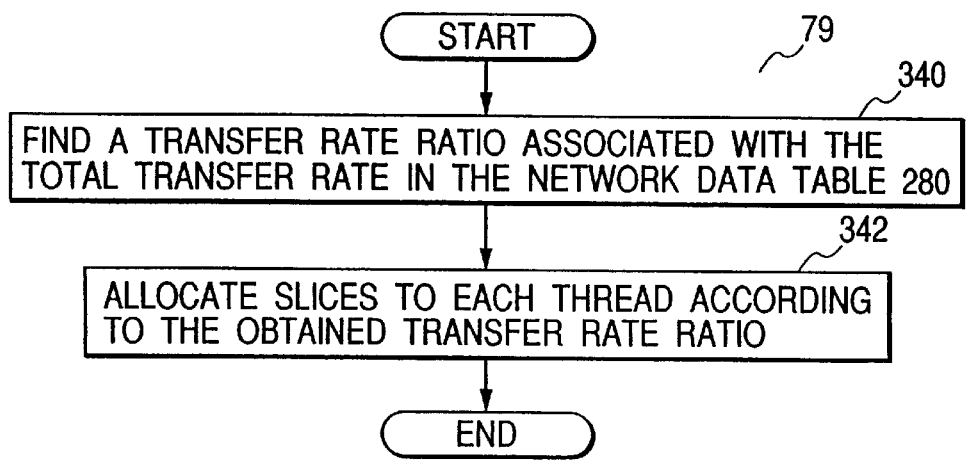

FIG. 23
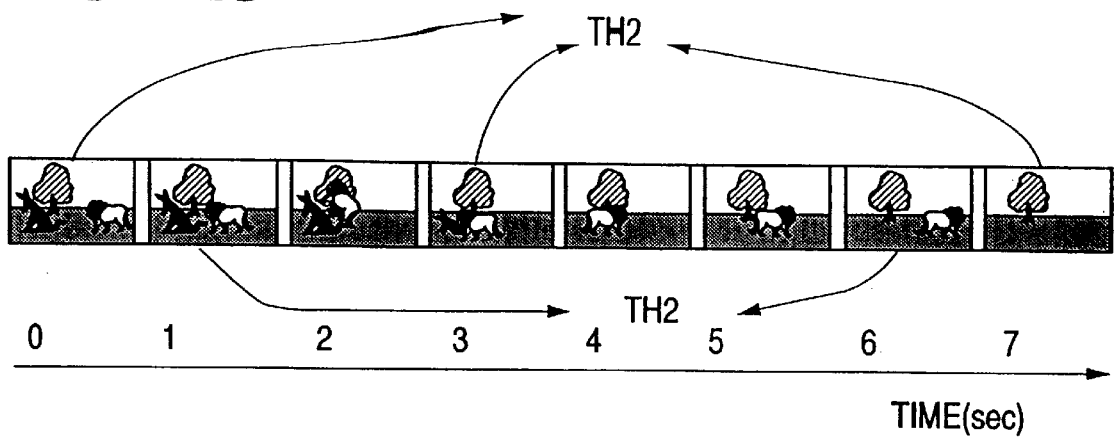
FIG. 24
| UNOCCUPIED PERIOD OF CPU PER SEC | SHARABLE INTERVAL (SI) |
|---|---|
| 0~100ms | 3 SEC |
| 101~300ms | 1 SEC |
| 301~1000ms | 0 SEC |
FIG. 25
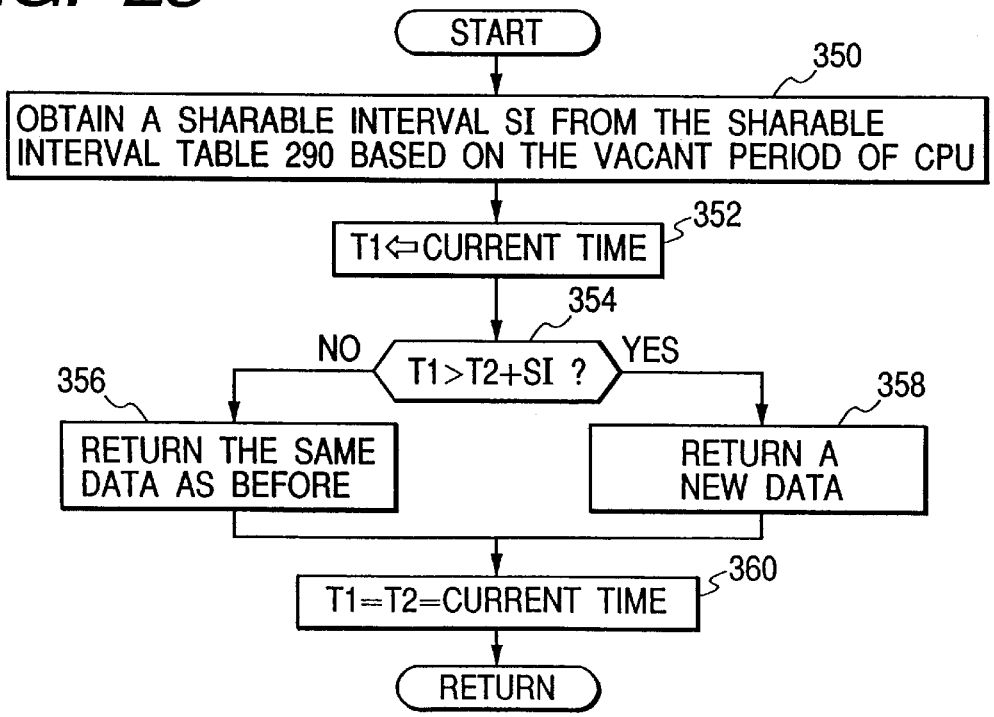

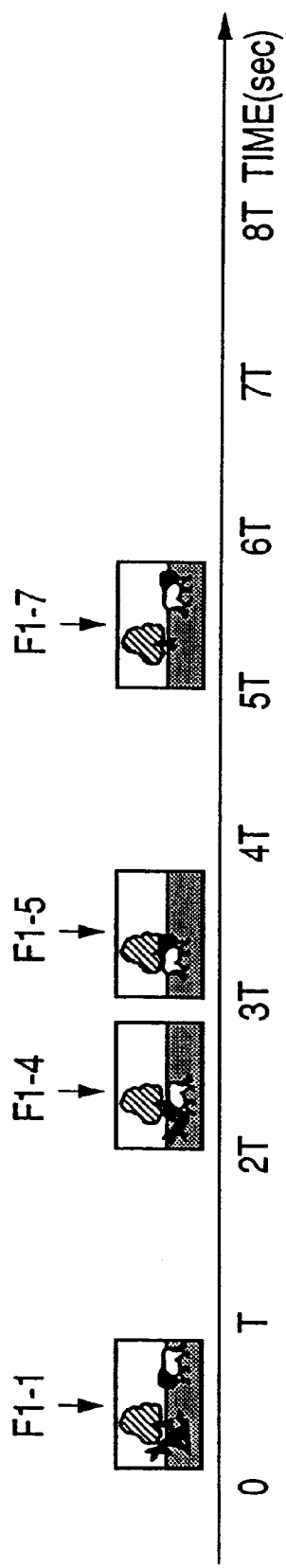

MULTIMEDIA SERVER

BACKGROUND OF THE INVENTION

1. Field of the Invention

The invention generally relates to a server for providing multimedia information to a network and, more particularly, to techniques for efficiently transmitting a plurality of time-series multimedia applications in a time-division multiplex by controlling the assignment of a CPU (central processing unit) operation time to the transmitted applications.

2. Description of the Prior Art

Applications including video, animation and/or audio are hereinafter referred to as time-series multimedia applications. Compressed multimedia applications may be either transmitted directly as they are (direct transmission), or once stored in a storage device and then transmitted at constant rates (stored transmission).

In the direct transmission, the compressed applications are launched into a network regardless of the transmission band of the network, which may cause the transmission rate to exceed the transmission band variable with time, resulting in the destruction of transmitted data. For this reason, the direction transmission is possible only when the network transmission band is sufficiently higher than the transmission rate, in which there is no need of the present invention.

A transmission scheme of stored multimedia at a constant rate is described in "Video server software—Video Network File System," IEICE (The Institute of Electronics, Information and Communication Engineers) trans. Vol. J-77-A, No. 9, pp. 1–8. In this system, stored applications are read out and transmitted at a constant rate. This system reads out a frame of data for each of stored applications to be transmitted for transmission. Assuming that two applications AP1 and AP2 are to be transmitted and that both the frame size of the two applications are 10 Kbps, if the applications AP1 and AP2 are to be transmitted at rates of 10 Kbps and 5 Kbps, respectively, then the system transmits one AP1 frame per second and one AP2 frame per two seconds. In this way, each application is transmitted at a constant rate as long as the total load on the CPU does not exceeds the processing capacity of the CPU and the total transmission rate dose not exceeds the transmission bandwidth of the network. However, These conditions are not always satisfied.

It is therefore an object of the invention to provide a method and a system which are used when actually measured transmission rates of a plurality of multimedia applications differ from required transmission rates for the applications and which are for allocating time slices of the CPU to the threads for transmitting the multimedia applications such that the applications are transmitted at the required transmission rate.

A reduction in the transmission rate of a thread causes a delay of transmission by the thread resulting in asynchronism among transmitted applications.

It is another object of the invention to provide a method of and a system for temporarily changing the allocation of the available time slices to the threads so as to resolve the a synchronism among transmitted applications.

It is another object of the invention to provide a method and a system which are used when the number of time slices available to the threads has decreased to be insufficient to transmit the applications to be transmitted and which adjust the allocation of the available time slices to the threads according to the priorities of the applications.

SUMMARY OF THE INVENTION

A method for transmitting multimedia applications including a video and an audio at respective adapted transfer rates in a server connected with a network is provided. The server operates on an operating system which permits a multithreading by allocating time slices to thread. The method comprises the steps of:

for each application, preparing data on a required transfer rate indicative of a permitted lowest transfer rate for the application;

generating threads for respective applications;

allocating an initial number of slices to each thread to let the threads transmit respective applications;

measuring a transfer rate of each thread at a time interval;

calculating a number of slices to be allocated to each thread such that the measured transfer rate of each thread (i.e., each application) becomes equal to the required transfer rate of the application transmitted by the thread; and allocating the calculated number of slices to each thread.

The number of slices are calculated by multiplying a current number of slices allocated to each thread by a ratio of the required transfer rate to the measured transfer rate.

In response to a detection of a synchronism among the applications, a corrected number of slices are temporarily allocated to each thread such that the applications have been synchronized by the end of a subsequent time interval.

In response to a detection of a decrease in a total of the measured transfer rates, the system allocates less slices to applications of lower priorities and more slices to an application of a higher priority.

A method for transmitting data to a plurality of destinations in a server connected with a network is also provided. The method compres the steps of;

creating a thread to each destination; and in response to a request from one of the thread, returning a unit of data to be preferably transmitted at a time of the request, wherein the step of returning a unit of data includes the step of:

in response to a detection that a difference between the time of the request and a time of last request from a thread different from the requesting thread is smaller than a value associated with an unoccupied period of a central processing unit of the server, returning a same unit of data as returned at the time of last request.

BRIEF DESCRIPTION OF THE DRAWING

The features and advantages of the present invention will be apparent from the following description of an exemplary embodiment of the invention and the accompanying drawing, in which:

FIG. 11 is a diagram showing an exemplary slice allocation based on the result of step 300 of FIG. 10;

FIG. 12 is a diagram showing multimedia frames transmitted by the threads TH1–TH3 on the basis of the allocation of FIG. 11;

FIG. 20 is a graph showing a relationship between the throughput and the transfer delay in the network 20;

FIG. 21 is a diagram showing a network data table 280 for the network 20;

FIG. 22 is a flow chart showing an exemplary transfer rate optimizing operation according to the principles of the invention;

FIG. 23 is a diagram showing exemplary timing of data requests from the threads TH1 and TH3;

FIG. 24 is an example of a sharable interval table according to the invention;

FIG. 25 is a flow chart showing an exemplary data read operation executed by CPU 100 under the control of a data read subroutine included in the control program 252 in response to a data request from a packet transmitter thread THi in a single media distribution in accordance with the principles of the invention;

FIG. 30 is a diagram showing an example of a frame stream transmitted from the server 1 to a client 30;

FIG. 31 is a diagram showing an exemplary received time table stored in a client 30 according to the invention;

Throughout the drawing, the same elements when shown in more than one figure are designated by the same reference numerals.

DETAILED DESCRIPTION OF THE PREFERRED EMBODIMENTS

Figure 1:
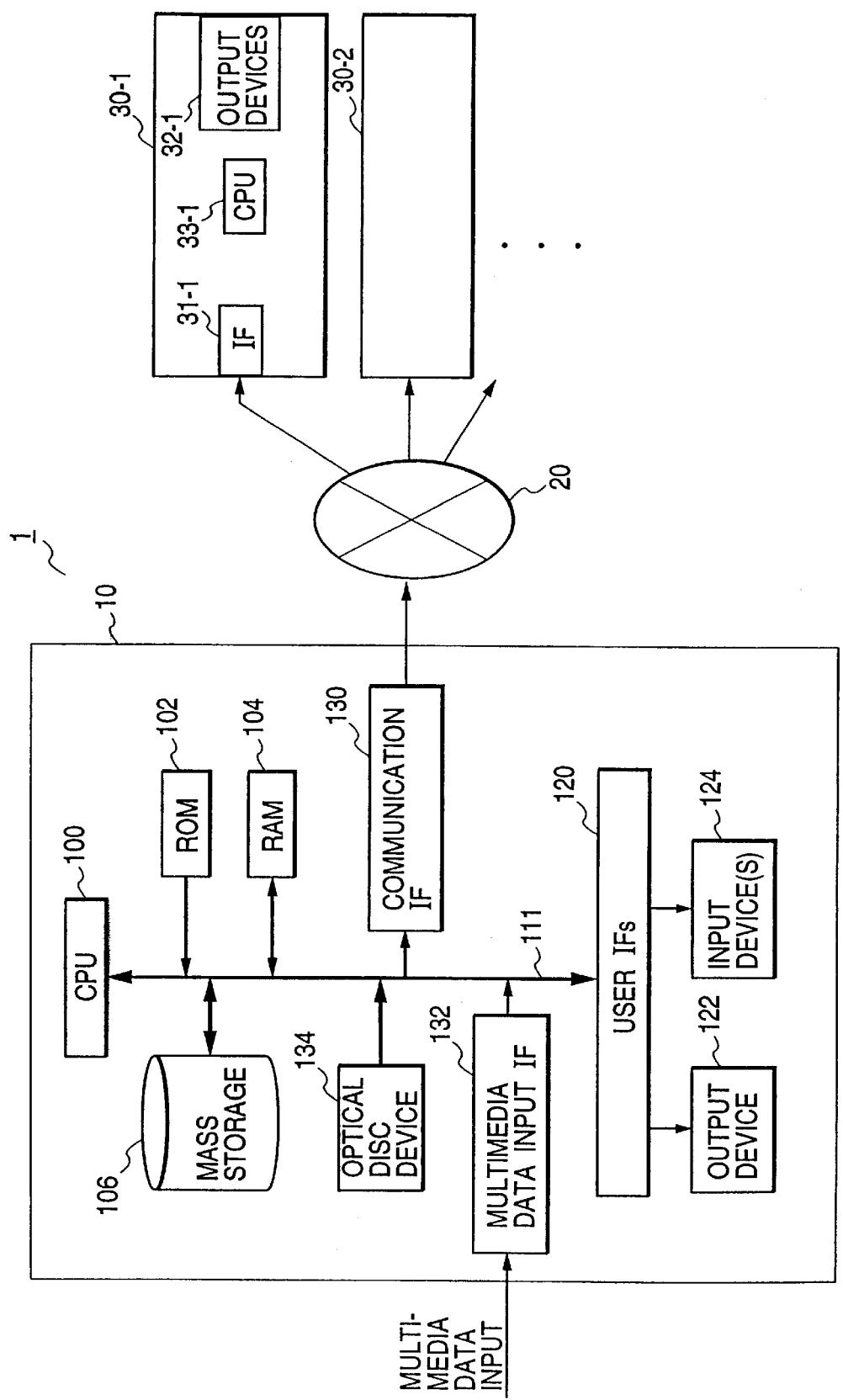
FIG. 1 is a schematic diagram showing an exemplary network 1 including a multimedia information server 10 and client terminals 30, the server transmitting a plurality of multimedia applications in accordance with an illustrative embodiment of the invention.

FIG. 1 is a schematic diagram showing an exemplary network 1 including a multimedia information server 10 and client terminals 30-1, 30-2, . . . , the server transmitting a plurality of multimedia applications in accordance with an illustrative embodiment of the invention. The server 10 and the clients 30 are interconnected with a network 20. The network 20 may be any suitable network which provide a time-division multiplexed multimedia application transfer with a limited transfer bandwidth.

The multimedia information server 10 may be any suitable computer comprising: a CPU 100; a read only memory (ROM) 102; a random access memory (RAM) 104; a mass storage device 106; a man-machine interfaces (IFs) 120; an output devices 122 such as a display device; input devices 124 such as a keyboard, a mouse, etc.; and a communication IF through which multimedia applications are launched into the network 20. In order to take in multimedia application, the server 10 further comprises a optical disc device 134 which plays an optical disc such as a DVD (digital video disc), a CD (compact disc), etc. and a multimedia data input IF 132 for receiving multimedia application data from the external.

Figure 2:
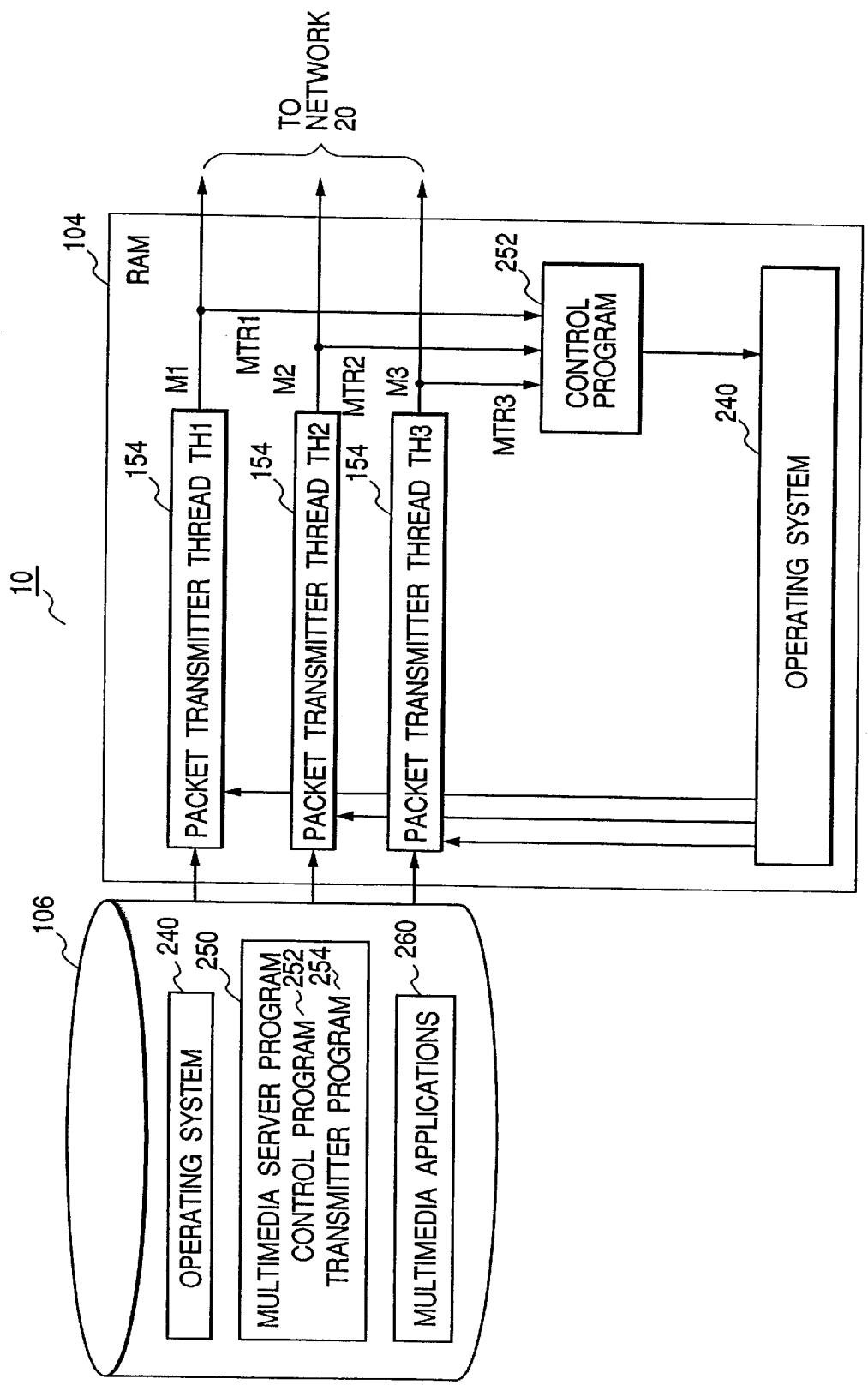
FIG. 2 is a schematic block diagram showing an exemplary architecture of the server 10 of FIG. 1 when it is operating.

FIG. 2 is a schematic block diagram showing an exemplary architecture of the server 10 of FIG. 1 when it is operating. The mass storage device 106 stores an operating system 240, a multimedia server program 250 for transmitting multimedia applications in accordance with the principles of the invention, and multimedia applications 260. The multimedia server program 250 includes a control program 252 which controls the transmission operations and a transmitter program 254 which is threaded during operation to actually transmit an application 260 specified by the control program 252. The operating system 240 allocates available time slices of the CPU 100 to packet transmitter threads 154 (i.e., to the application to be transmitted). The control program 215 determines the number of time slices to be allocated to each thread 154 based on required transfer rates stored in the mass storage device 106 and actual transfer rates measured by monitoring the transmitted data streams as detailed below.

It is noted that the way of the mass storage 106 storing a multimedia application is either such that the whole application is stored continuously or such that a fraction of the application is sequentially stored and read out for transmission just as is done in a buffer.

Figure 3:
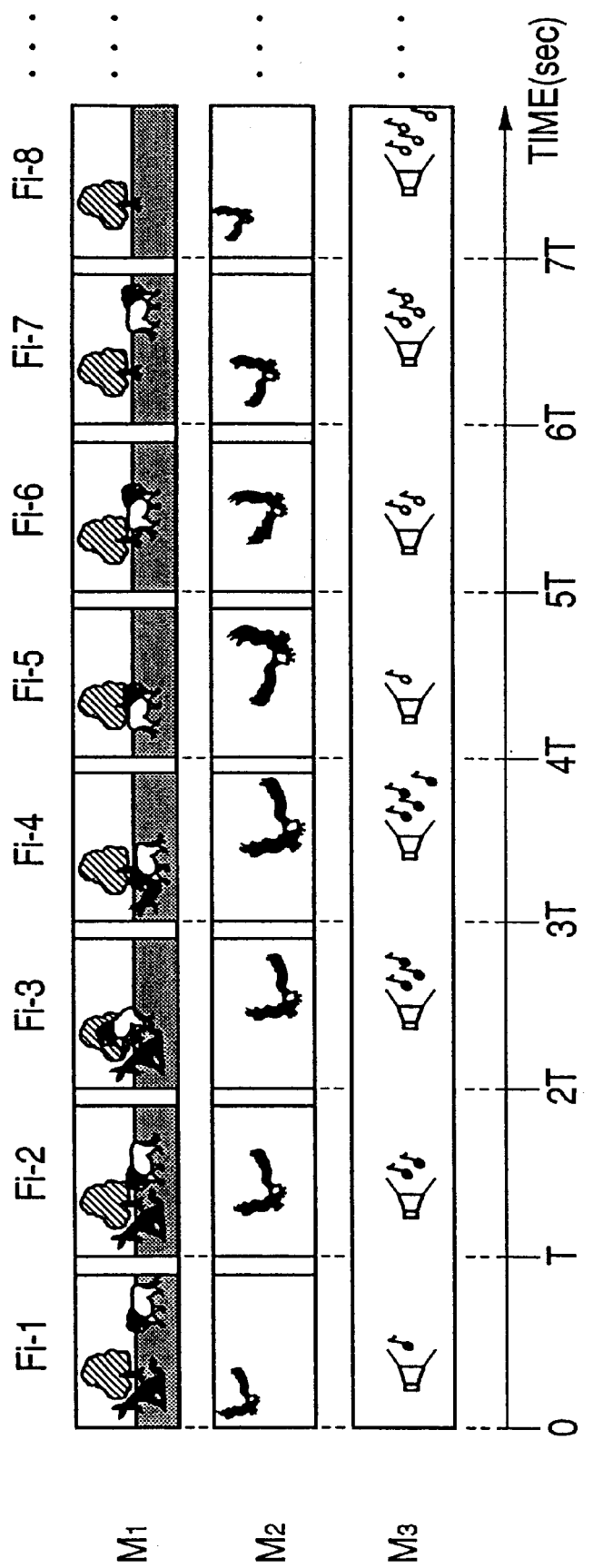
FIG. 3 is a diagram showing the applications M1 through M3.

In the following description of the operation, it is assumed that three multimedia applications, say, a first motion picture M1, a second motion picture M2 and an audio M3 are to be transmitted. FIG. 3 is a diagram showing the applications M1 through M3. In FIG. 3, each of the application, Mi (i=1, 2, 3), comprises frames of data, Fi-1, Fi-2, Fi-3, . . . It is assumed that each frame Fi-j (j=1, 2, . . . .) should be presented (i.e., transmitted) every T second. In other words, the frame frequency of the materials M1 through M3 is 1/T Hz.

Figures 4, 5:
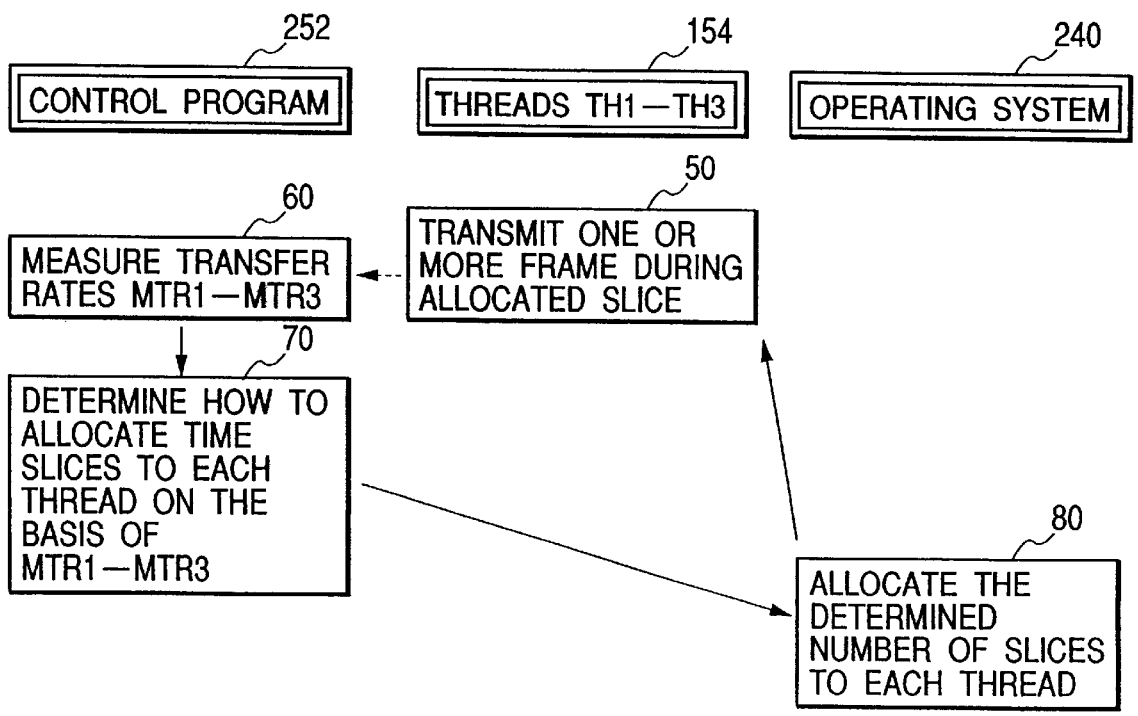
FIG. 4 is a diagram showing a multimedia application table 270 for containing various information on the multimedia applications 260 stored in the mass storage 106.
FIG. 5 is a diagram showing how the operating system 240 initially allocates available time slices to the threads TH1 through TH3.

FIG. 4 is a diagram showing a multimedia application table 270 for containing various information on the multimedia applications 260 stored in the mass storage 106. Each record of the table 270 at least comprises the fields of application ID MIDi and required transfer rate RTRi of the application. According to the table 270, the required transfer rates of the applications M1, M2 and M3 are 10 Kbps, 5 Kbps and 10 Kbps, respectively.

Figure 6:
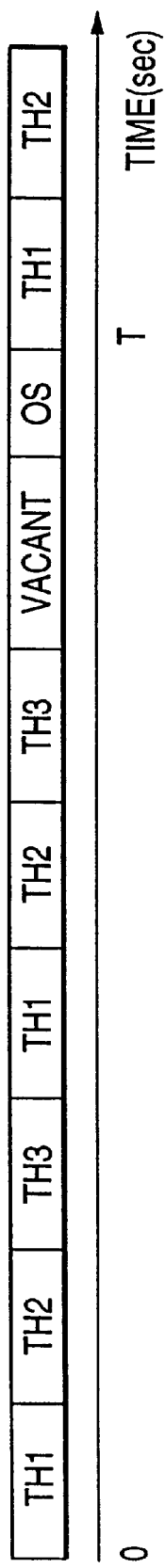
FIG. 6 is a diagram showing an exemplary operation cycle by the threads 154, the control program 252 and the OS 240.

For each application to be transmitted, Mi, the control program 252 creates a packet transmitter thread THi. The operating system (OS) 240 responsively allocates some time slices to each thread THi in a predetermined manner. It is assumed that the OS 240 allocates the same number of slices to each thread THi as shown in FIG. 5. In FIG. 6, the time slice labeled "VACAUNT" is a time period for which the CPU 100 has nothing to do. The time slice labeled "OS" is a time period for which the CPU 100 is occupied by the OS 240 or other application program(s).

Once slices are allocated to the packet transmitter threads 154, the threads start respective transmission operations. FIG. 6 is a diagramn showing exemplary operation cycle by the threads 154, the control program 252 and the OS 240 during transmission operation. While the threads 154 are transmitting the applications M1 through M3 (block 50), the control program 252 measures the transfer rates MTR1 through MTR3 of the threads TH1 through TH3 (block 60). The control program 252 preferably periodically determines how to allocate time slices to the threads 154 on the basis of the measure transfer rates MTR1–3 to inform the OS 240 of the determined numbers of slices to be allocated (block 70). Then, the OS 240 allocates the determined numbers of time slices to the threads 154 (block 80). The cycle comprisine blocks 50 through 80 continues till the applications M1 through M3 are exhausted.

In block 50, each thread THi 154 reads out the first frame Fi-1 of the specified application Mi, adds a destination address to the read frame Fi-1 data to form a packet, and sends out the packet to the network 20. It should be noted that in reading out a frame of data, a thread THi may read out the frame data either as it is or in a thinned-out manner. It is further noted that a thread THi may compress and encode the read frame data before assembling the read frame data into a packet.

Figure 7:
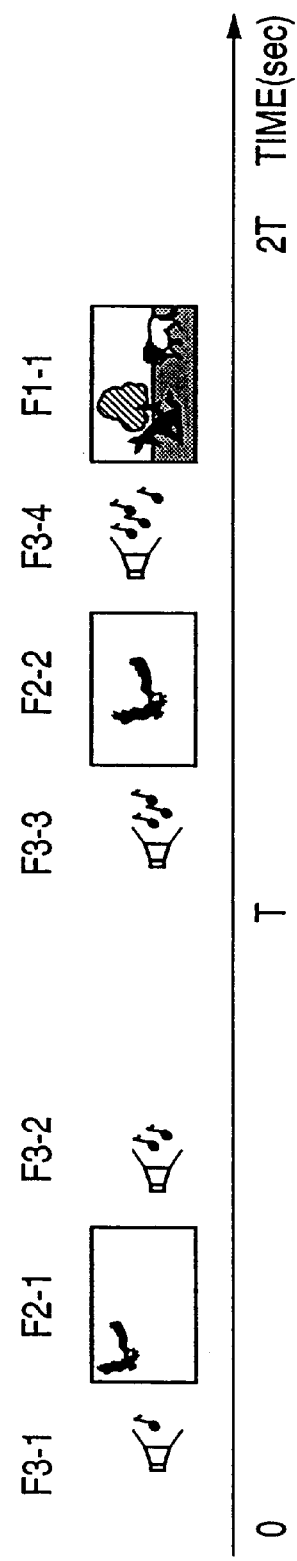
FIG. 7 is a diagram showing how frames of FIG. 3 has been transmitted for the first 2 T seconds.

The process from reading out a frame of a multimedia application Mi to sending out the assembled packet has to be done for the slice time allocated to the application Mi or the thread THi. However, a time period necessary for the process varies depending on the type and the format of the application Therefore the amounts of transmitted data from the threads 154 may vary even if the same time is allocated to the threads 154. It is assumed that frames of the applications M1 through M3 has been transmitted for the first 2T seconds as shown in FIG. 7.

Figure 8:
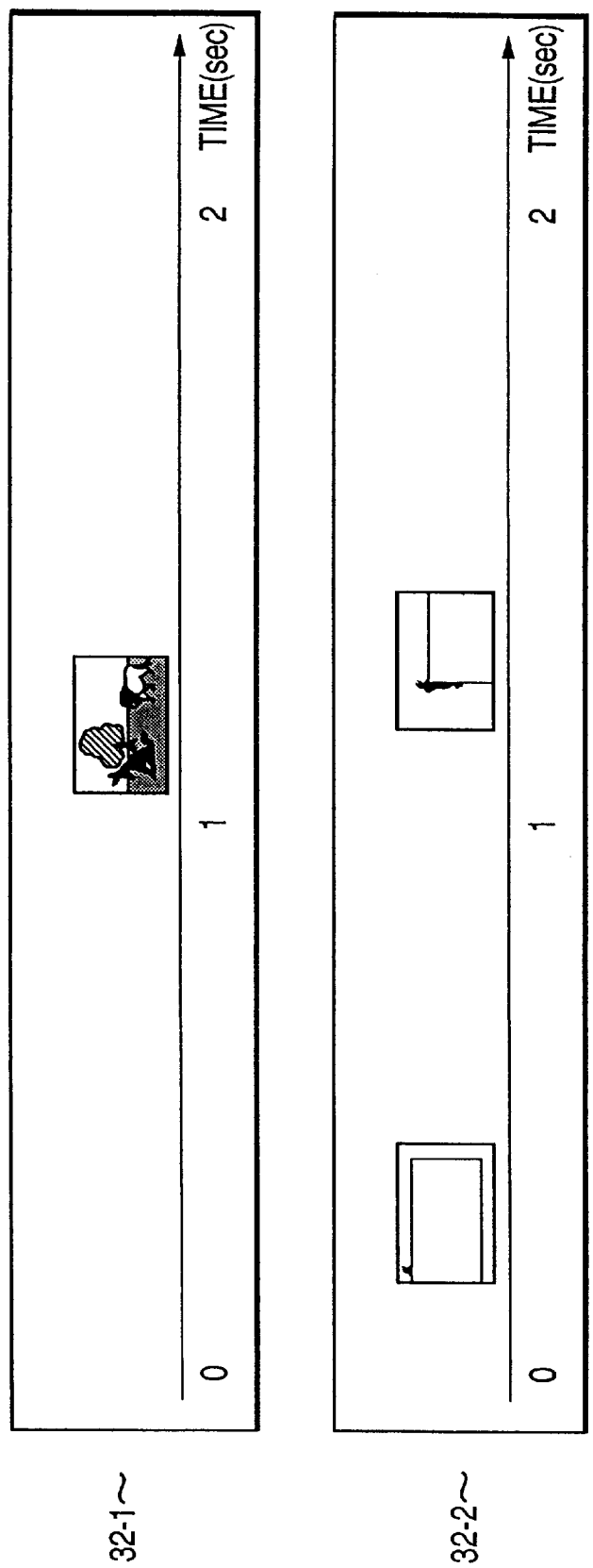
FIG. 8 is a diagram showing exemplary screens 32-1 and 32-2 of the clients 30-1 and 30-2 when the applications M1 and M2 are addressed to the clients 30-1 and 30-2, respectively.

On the other hand, a client terminal, say, 30-1 receives a packet that is addressed to the terminal 30-1 and supplies the multimedia data contained in the packet to a suitable output device 32-1. FIG. 8 shows how the transmitted frames of FIG. 7 are presented in the output devices 32-1 and 32-2 of the clients 30-1 30-2 when the application M1 is addressed to the client 30-1 and the applications M2 and M3 are addressed to the client 30-2. However, if data is transmitted at a rate exceeding the processing capacity of the client, say, 30-2, then this results in defective pictures in case of image data and noisy sounds in case of audio data as shown in the output device 32-2 of FIG. 8.

Turning back to FIG. 6, the control program 252 periodically measures transfer rates of the threads TH1 through TH3, MTR1 through MTR3, respectively (in block 60). Assuming that the data amounts of the applications M1 through M3 for T seconds (i.e., a frame's worth of each application Mi) are 10 Kbps, then the average transfer rates for the first 2T seconds, MTR1 through MTR3, are 5 Kbps, 10 Kbps and 20 Kbps, respectively as seen from FIG. 7.

Figure 9:
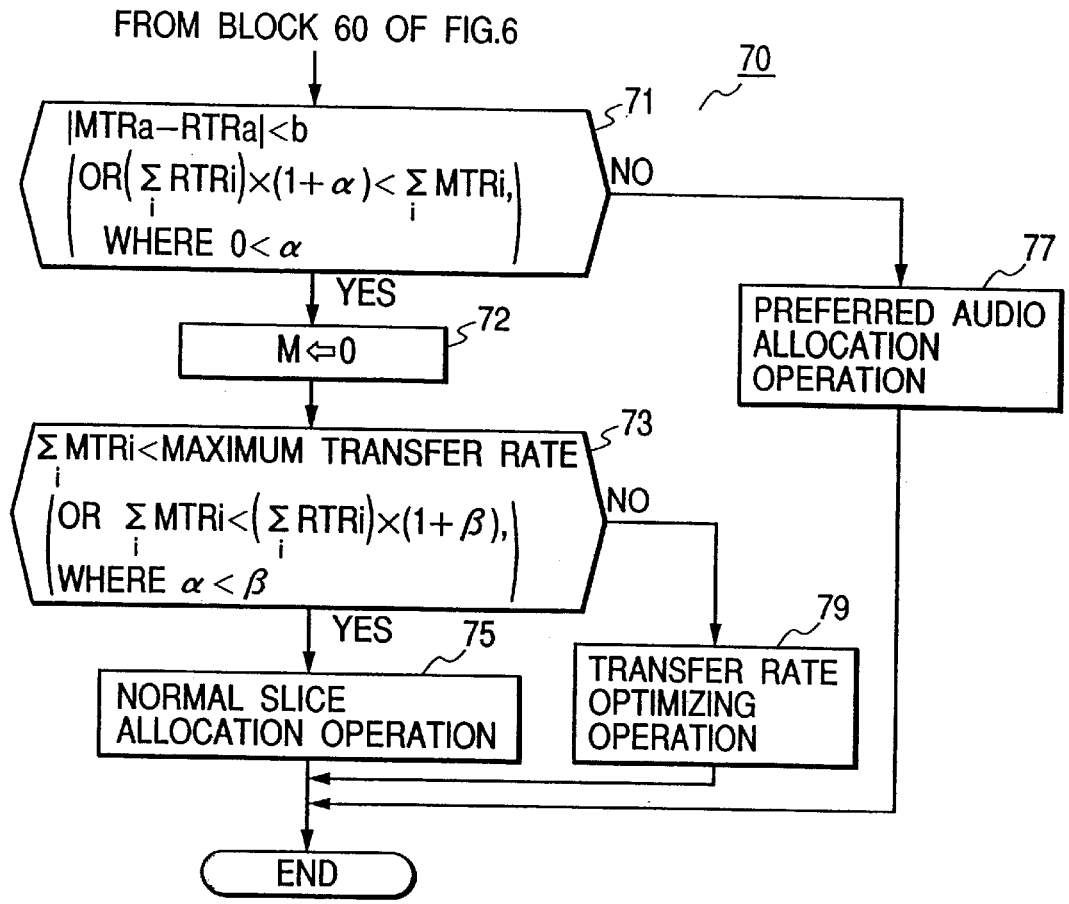
FIG. 9 is a flow chart showing a slice allocating operation of CPU 100 under the control of the control program 252 in accordance with the principles of the invention.

In block 70, the control program 252 determines how to allocate time slices to each thread THi on the basis of the measured transfer rates MTR1 through MTR3. FIG. 9 is a flow chart showing a slice allocating operation 70 of CPU 100 under the control of the control program 252 in accordance with the principles of the invention.

After step 60 of FIG. 6, CPU 100 makes a test to see if the applications M1 though M3 can be transmitted at the required transfer rates RTR1 through RTR3 respectively in step 71. Specifically, CPU 100 makes the following test:

$$|MTRa-RTRa|<b, \qquad (0)$$

where the suffix "a" indicates that the application is an audio application, and b is a positive value. The value b may a constant or vary with time. If the value b is variable, the value b may be automatically changed by measuring the change of the transfer rate MTRa of the audio application(s) such that the equality (0) is not affected by the change in the transfer rate MTRa. Since M3 is an audio application and MTR3 and RTR3 are 20 Kbps and 10 Kbps as described above, a test is made to see if |MTR3–RTR3|=10<b.

$$(1+\alpha)\cdot \sum_i RTRi < \sum_i MTRi, \qquad (1)$$

where $\alpha$ is a positive constant.

If the inequality (0) and/or (1) is true, CPU 100 stores 0 in a location M or sets a flag M to 0 in step 72 (the flag M is used in a preferred audio allocation operation detailed later). In step 73, CPU 100l makes another test in step 73 to see if the total transfer rate is smaller than the maximum transfer rate of the network 20. Alternatively, the following test may be made.

$$\sum_i MTRi < (1+\beta)\cdot \sum_i RTRi, \qquad (2)$$

where $\beta$ is a constant larger $\alpha$. In this case, it is preferable to set the right side of the inequality (2) to a value near the maximum transfer rate of the network 20. If the test result is YES in step 73, which means that the overall transmission rate is in an acceptable range, then CPU 100 performs a normal slice allocation operation (detailed later) in step 75 and ends the slice allocating operation 70.

If the test result is NO in decision step 71, which means that one or more application can not be transmitted at a rate not lower than a required transfer rate, then CPU 100 performs a preferred audio allocation operation (detailed later) in step 77. If the test result is NO in decision step 73, which means that the measured transfer rates are so high that the delay time in the network 20 can not be neglected, then CPU 100 performs a transfer rate optimizing operation (detailed later) in step 79. After step 77 or 79, CPU 100 ends the slice allocating operation.

Assuming that the constants α and β are 0 and 0.5, respectively, we discuss the above-mentioned example. As described above, the sum of the required transfer rates is 25 Kbps (=5+10+5 in FIG. 4), and the sum of the measured transfer rates is 35 Kbps (=5+10+20). It is clear that the inquality (1) is satisfied. Further, since 35<1.5·25(=37.5), the inequality (2) is also satisfied. Thus, the normal transfer rate subroutine is executed in this case.

Normal Slice Allocation Operation

Figure 10:
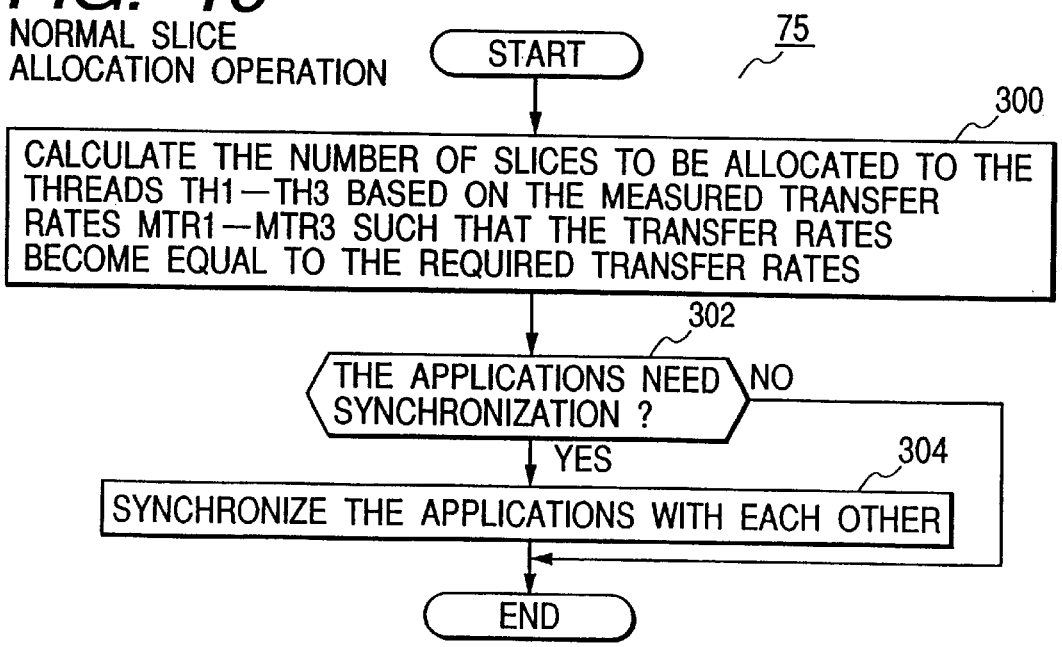
FIG. 10 is a flow chart showing an exemplary normal slice allocation operation 75 executed by CPU 100 under the condition of the control program 252 in accordance with the principles of the invention.

FIG. 10 is a flow chart showing an exemplary normal slice allocation operation 75 executed by CPU 100 under the condition of the control program 252 in accordance with the principles of the invention. In step 300, CPU 100 calculates the number of slices to be allocated to the threads TH1–TH3 based on the measured transfer rates MTR1–MTR3 such that the transfer rates become equal to the required transfer rates RTR1–RTR3.

One of allocation schemes adaptable in this case is to calculating the number of slices to be allocated to the thread THi simply by using the ratio of RTRi/MTRi. Specifically, assuming that the number of slices having been allocated to a thread THi is SNi and the number of slices to be allocated to a thread THi is SNi', the number SNi' is given by the equation:

$$SNi'=SNi\cdot(RTRi/MTRi). \quad (3)$$

Since SN1=SN2=SN3=2 according to FIG. 5, we have:

$$SN1'=2\cdot(10/5)=4$$

$$SN2'=2\cdot(5/10)=1$$

and $$SN3'=2\cdot(10/20)=1.$$

Accordingly, four slices are allocated to the thread TH1 and one slice is allocated to each of the threads TH2 and TH3 for every T sec. as shown in FIG. 11. The changing of slice allocation results in data transmission for the next 2T sec. as shown in FIG. 12. In this case, the block 60 of FIG. 6 again measures the transfer rates of the threads TH1 through TH3 to obtain:

$$MTR1=10\text{ Kbps,}$$

$$MTR2=5\text{ Kbps,}$$

and $$MTR3=10\text{ Kbps.}$$

Figure 13:
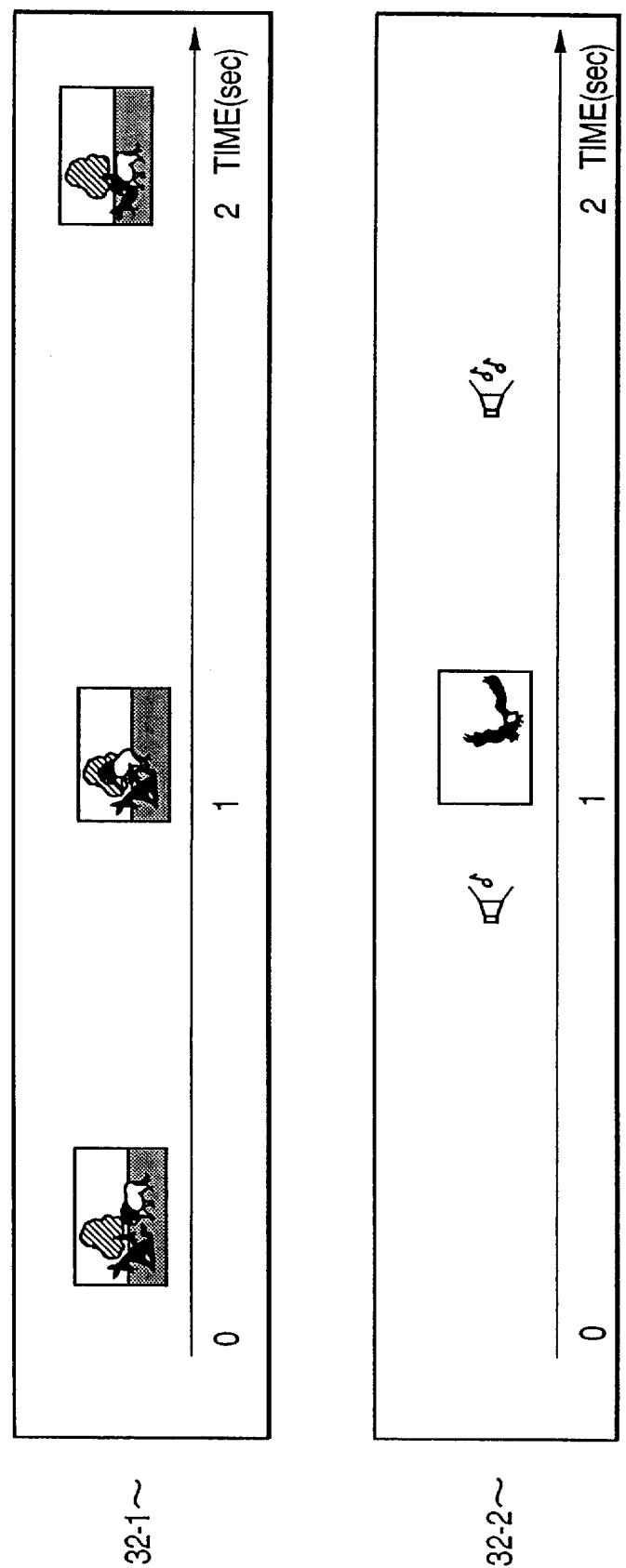
FIG. 13 is a diagram showing exemplary screens 32-1 and 32-2 of the clients 30-1 and 30-2 when multimedia frames are transmitted as shown in FIG. 12.

In this case, the frames of FIG. 12 are presented on relevant output devices 32-1 and 32-2 of the clients 30-1 and 30-2 as shown in FIG. 13.

Though the ratios RTRi/MTRi are simply used for the calculation of the number of time slices to be allocated to the threads TH1–TH3, the allocated slice numbers may be adaptively changed at each execution of step 300.

Thus, even if CPU 100 has changed the slice allocation for its own processing or other application programs, the multimedia information server 10 can automatically recover the appropriate slice allocation.

Further, CPU 100 make s a test in step 302 to see if the multimedia applications need synchroniation. If not, then CPU 100 simply ends the normal slice allocation operation 75. If not, CPU 100 synchronize the applications with each other in step 304. The synchronization scheme is to transmit data of applications other than the application that has been transmitted most for the subsequent measurement interval Tm (Tm is assumed to be 2T sec. in this specific example) such that the applications will have been synchronized at the end of the subsequent measurement interval.

Figure 14:
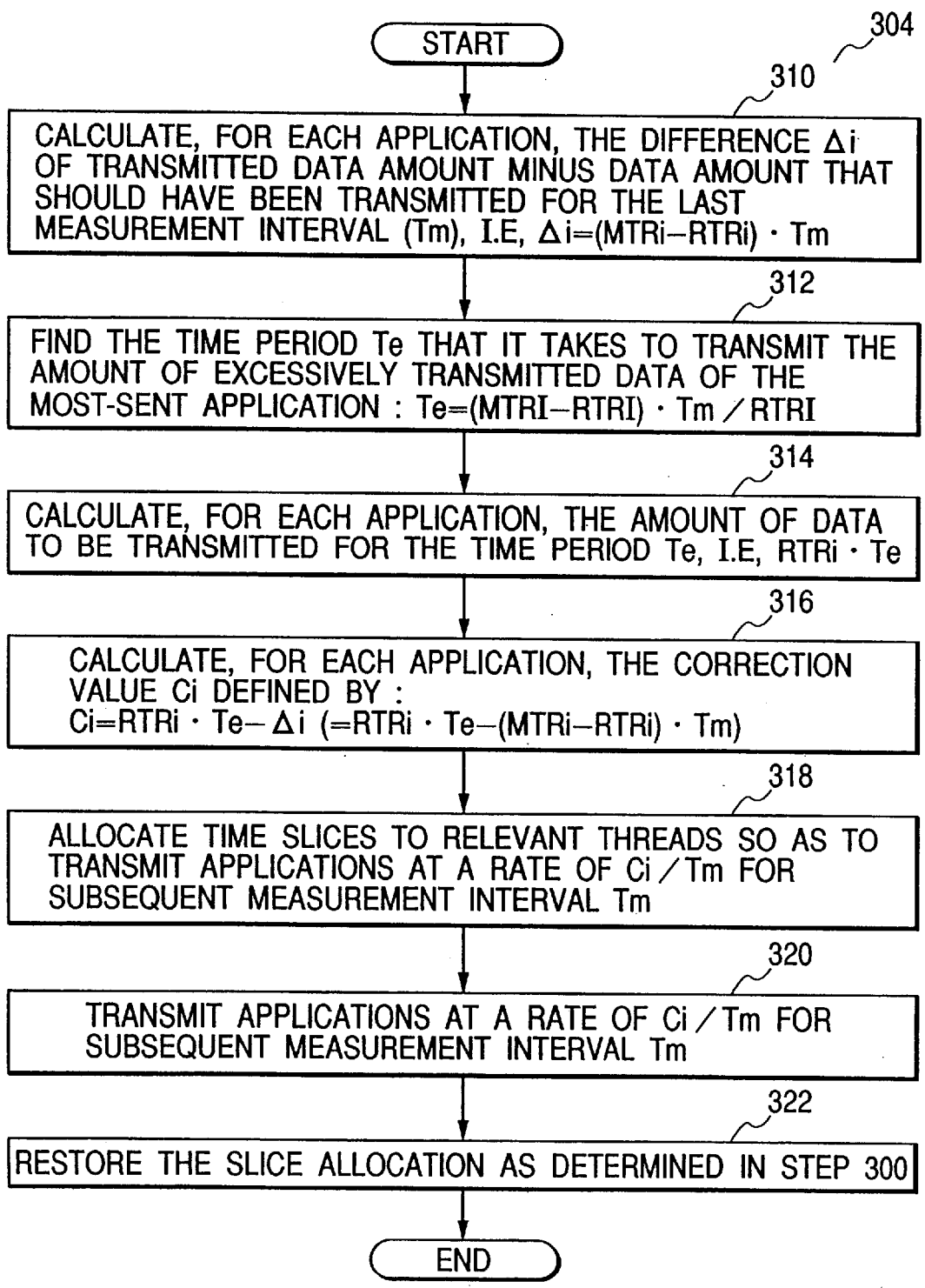
FIG. 14 is a flow chart showing an exemplary synchronization operation according to the principles of the invention.

FIG. 14 is a flow chart showing an exemplary synchronization operation according to the principles of the invention. In step 310, CPU 100 calculates, for each application, the difference Δi of the transmitted data amount minus the data amount that should have been transmitted for the last measurement interval (Tm), ie., $$\Delta i=(MTRi-RTRi)\cdot Tm.$$

In this example, assuming Tm to be 2T, we obtain:

$$\Delta 1=-10T\,K\text{bits}$$

$$\Delta 2=+10T\,K\text{bits}$$

$$\Delta 3=+20\ T\,K\text{bits} \quad (4)$$

In step 312, CPU 100 finds the time period Te that it takes to transmit the excessively transmitted data of the most-sent application:

$$Te = \Delta i / RTRi$$

$$= (MTRi - RTRi)\cdot Tm / RTRi.$$

Since the most-sent application is M3 in this specific example, we obtain Te=2T(=20T/10).

In step 314, CPU 100 calculates, for each application, the amount of data to be transmitted for the time period Te, i.e., RTRi·Te. In this case, the amounts of data to be transmitted for the time period 2T are:

$$20T\,K\text{bits for }M1$$

$$10T\,K\text{bits for }M2 \quad (5)$$

0 for M3 (20 Kbits of data has been excessively transmitted).

In step 316, CPU 100 calculates, for each application Mi, the correction value Ci defined by:

$$Ci=RTRi\cdot Te-\Delta i(=RTRi\cdot Te-(MTRi-RTRi)\cdot Tm).$$

Figure 15:
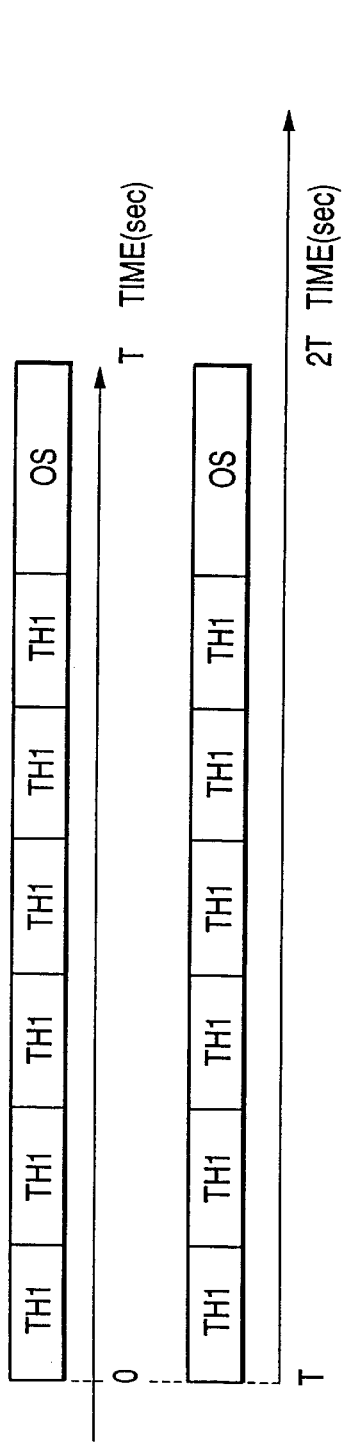
FIG. 15 is a diagram showing an exemplary slice allocation based on the result of step 318 of FIG. 14.

In this example, the correction values for the applications M1 and M2 are 30T Kbits and 0 bit, respectively. That is, in order to synchronize the applications, it is only necessary to transmit the application M1 at a rate of 15 Kbps (=Ci/Tm) for subsequent measurement interval 2T (=Tm). CPU 100 allocates time the slices to relevant threads accordingly in step 318. In step 320, CPU 100 actually transmit applications at a rate of 15 Kbps for subsequent measurement interval 2T (=Tm). In this case, slices are allocated to the thread TH1 as shown in FIG. 15. In step 322, CPU 100 restores the slice allocation as determined in step 300 and ends the synchronization operation 304.

According to the invention, the synchronization of the transmitted media is automatically maintained.

Preferred Audio Allocation Operation

The throughput or the amount of transferred data of the network 20 may lower or the available slices of CPU 100 may decrease to the extent that the applications to be transmitted can no longer transmitted at their required transfer rates. In such a case, a preferred audio allocation operation is executed.

Figure 16:
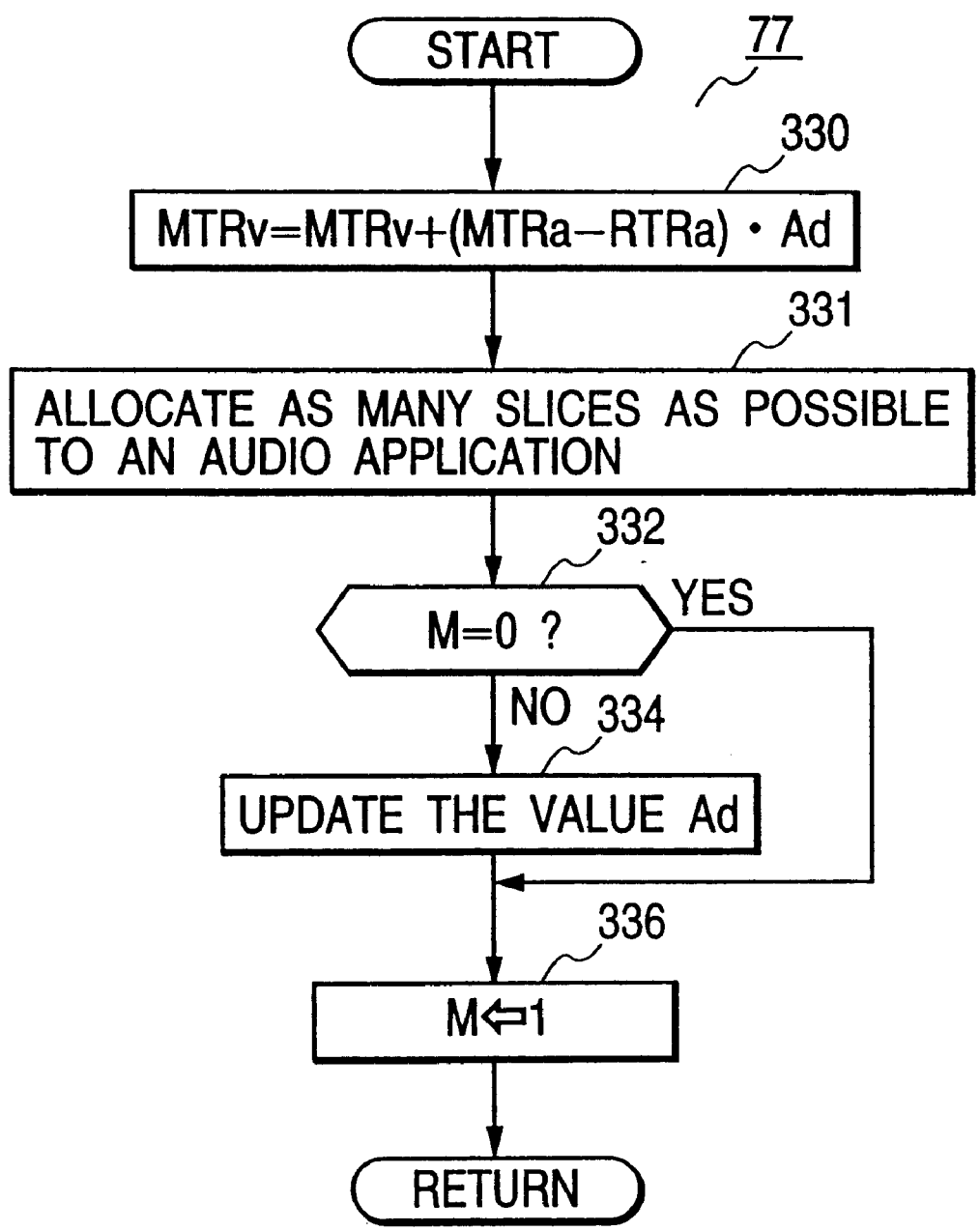
FIG. 16 is a flow chart showing an exemplary preferred audio allocation operation according to the principles of the invention.

FIG. 16 is a flow chart showing an exemplary preferred audio allocation operation according to the principles of the intention. In this operation, referring to the priorities stored in the multimedia application table 270 of FIG. 4, more slices are allocated as possible to the applications of higher priority by reducing the number of slices allocated to lower-priority applications.

In step 330, CPU 100 adjusts the subsequent transfer rates TRv of image applications (which is denoted as Mv) as follows:

$$TRv=MTRv+(MTRa-RTRa)\cdot Ad,$$

where Ad is a positive variable coefficient. If the measured transfer rate MTRa of the audio application Ma (a=3 in this case) is smaller than the required transfer rate RTRa of the audio application Ma, the transfer rates TRv of image applications Mv is reduced. If the measured transfer rate MTRa is larger than the required transfer rate RTRa of the audio application Ma, the transfer rates TRv of image applications Mv is increased. In step 331, CPU 100 allocates as many slices as possible to the audio application (M3 in this case). In step 332, CPU 100 makes a test to see if M=0. If so, which means that this preferred audio allocation operation has not been executed, then CPU 100 proceeds to step 336. Otherwise, CPU 100 updates the value of Ad in step 334. The coefficient Ad is changed in any of the following ways:

1. If the unequal relation between the measured and the required transfer rates is the same as the last preferred audio allocation operation, then the coefficient Ad is increased and, otherwise, decreased.
1. The degree of the increase and the decrease of (1) is made proportional to the difference between the measured and the required transfer rates.
1. The coefficient Ad is set as Ad=RTRA−MTRa. After step 334, CPU 100 set the flag M to 1.

This causes the coefficient Ad to converge rapidly.

Figure 19:
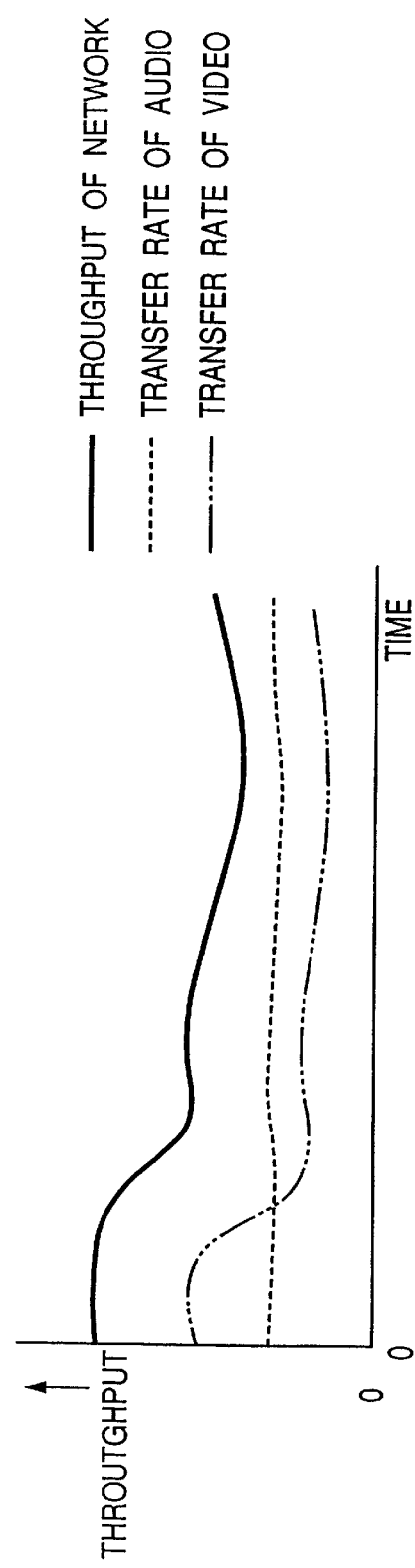
FIG. 19 is a diagram showing how the transfer rates of an audio and a video change with the change in the transmission bandwidth of the network 20.
Figure 17:
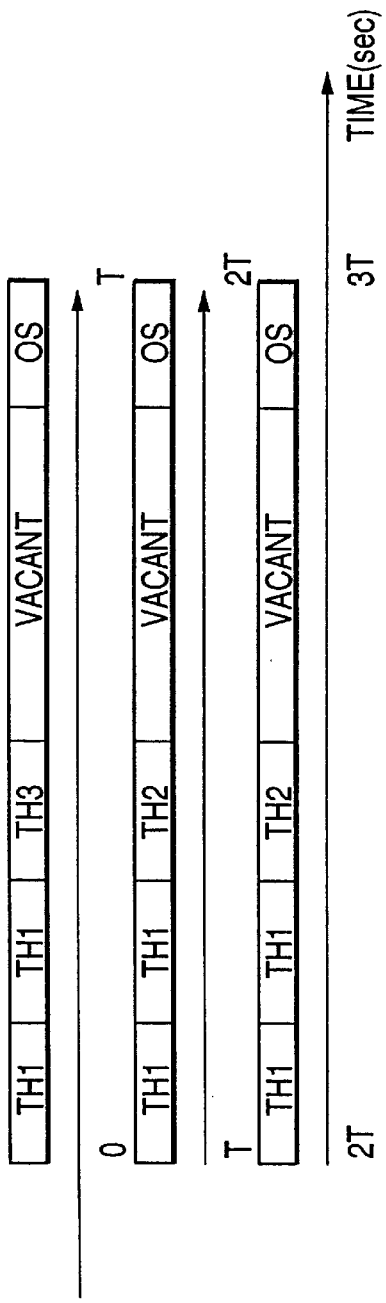
FIG. 17 is a diagram showing an exemplary allocation of time slices before the preferred audio allocation operation 77 is executed.
Figure 18:
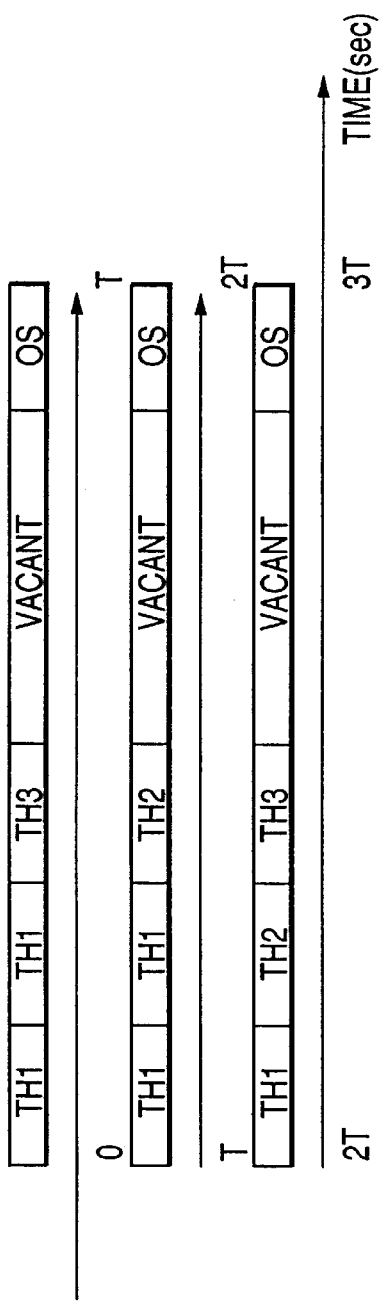
FIG. 18 is a diagram showing an exemplary allocation of time slices after the preferred audio allocation operation 77 is executed.

For example, If the allocated slices are allocated as shown in FIG. 17 in step 71, then an execution of the preferred audio allocation operation results in an allocation of FIG. 18. FIG. 19 shows how the transfer rates of an audio and a video change with the change in the transmission bandwidth of the network 20.

Transfer Rate Optimizing Operation

Generally speaking, a network 20 is characterized in that the more the transfer rate increases, the longer the delay time becomes as shown in FIG. 20. This is because a single transmission bandwidth is shared by TDM (time-division multiplexing). Almost all of the conventionally used networks have this characteristic. The transfer rate optimizing operation minimizes the delay that occurs in the network 20.

The relationship between the maximum transfer rate and the delay time is preferably measured in advance with respect to the network 20 and stored in the mass storage device 106, Alternatively, the relationship may be periodically and automatically measured.

FIG. 22 is a flow chart showing an exemplary transfer rate optimizing operation according to the principles of the invention. In step 340, CPU 100 finds a transfer rate ratio (which enables a low delay transmission) associated with the total transfer rate $$\sum_i MTRi$$

in the network data table 280. Since the total transfer rate (MTR1+MTR2+MTR3 in this example) is 15, the transfer rate ratio that enables a low delay transmission is 85%. That is, the transfer rate that enables the low delay transmission is 13 Kbps (=15 Kbps×85%). In step 342, CPU 100 allocates slices to each thread THi according to the obtained transfer rate (13 Kbps in this specific example). This allocation is such that more slices are reduced for applications with a lower priority. This allocation is preferably performed as the above-described preferred audio allocation operation of FIG. 16.

Distribution of the Same Data

It is sometimes the case when the same application is transmitted to a plurality of clients. Though all of the above-described features can be applied to this case, further techniques is available for this case.

It is assumed that the packet transmitter threads TH1 and TH3 issues data requests at the timing as shown in FIG. 23. It often happens that the threads TH1 and TH3 issue the data requests not at the same time but in vary near timing. If the same data are used or shared by the thread TH1 and TH2 in such a case, it is very efficient.

FIG. 24 is an exemplary sharable interval table 290 according to the invention. A sharable interval (SI) is a time period in which a data sharing is permitted between requests from the threads TH1 and TH2. In the sharable interval table 290, a sharable interval (SI) is associated with corresponding unoccupied (vacant) period of CPU 100.

FIG. 25 is a flow chart showing an exemplary data read operation executed by CPU 100 under the control of a data read subroutine included in the control program 252 in response to a data request from a packet transmitter thread THi in a single media distribution in accordance with the principles of the invention. In step 350, CPU 100 obtains a sharable interval (SI) associated with the vacant period of CPU 100 from a sharable interval table 290. In step 352, CPU 100 sets Ti to the current time (i.e., the requested time). In step 354, CPU 100 makes a test to see if it (=T1) is more than SI after the last requested time (T2). i.e., T1>T2+SI. If so, the CPU 100 returns a new frame of data in step 358. If not, the CPU 100 returns the same frame of data in step 356. After step 356 or 358, CPU 100 sets the value of T1 and T2 to the current time in step 360.

Figure 26:
FIG. 26 is a diagram showing an exemplary allocation of slices to the threads TH1 and TH2.
Figure 27:
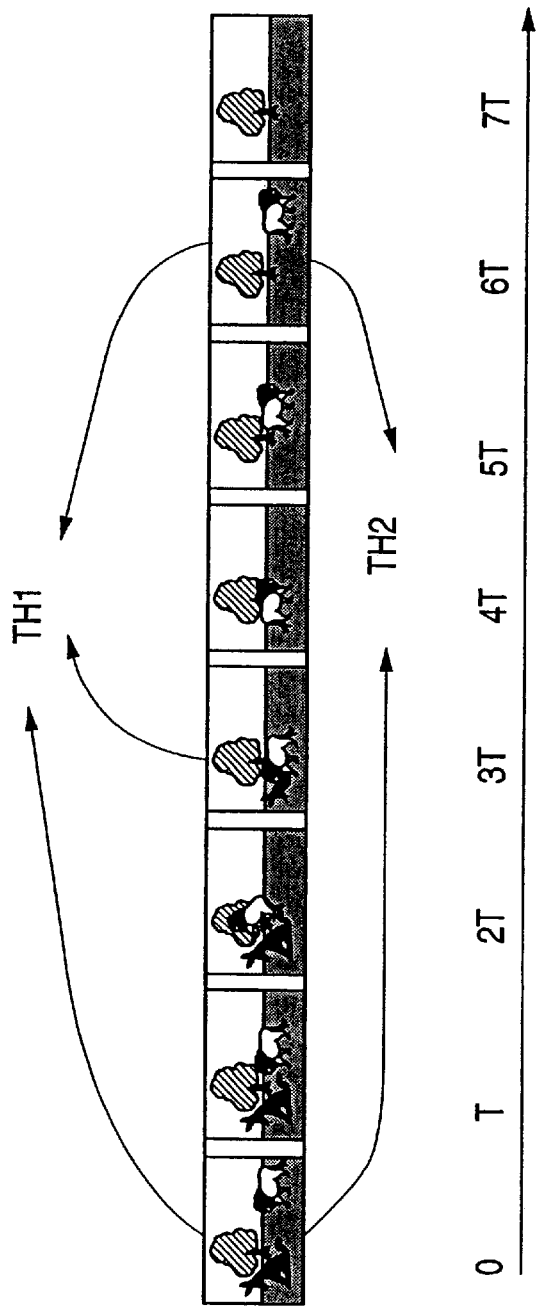
FIG. 27 is a diagram showing how frames are returned to the threads in response to the requests issued as shown in FIG. 23 in an allocation state of FIG. 26.
Figure 28:
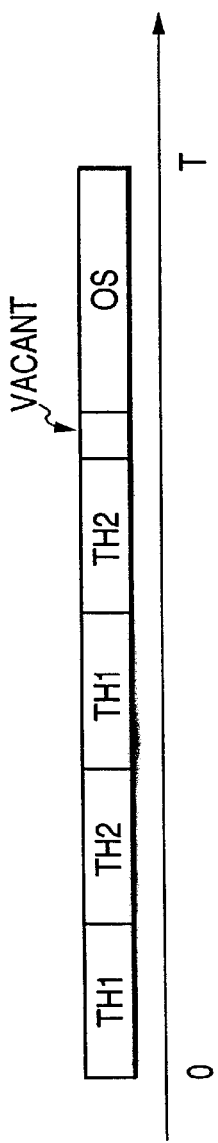
FIG. 28 is a diagram showing an exemplary allocation of slices to the threads TH1 and TH2.
Figure 29:
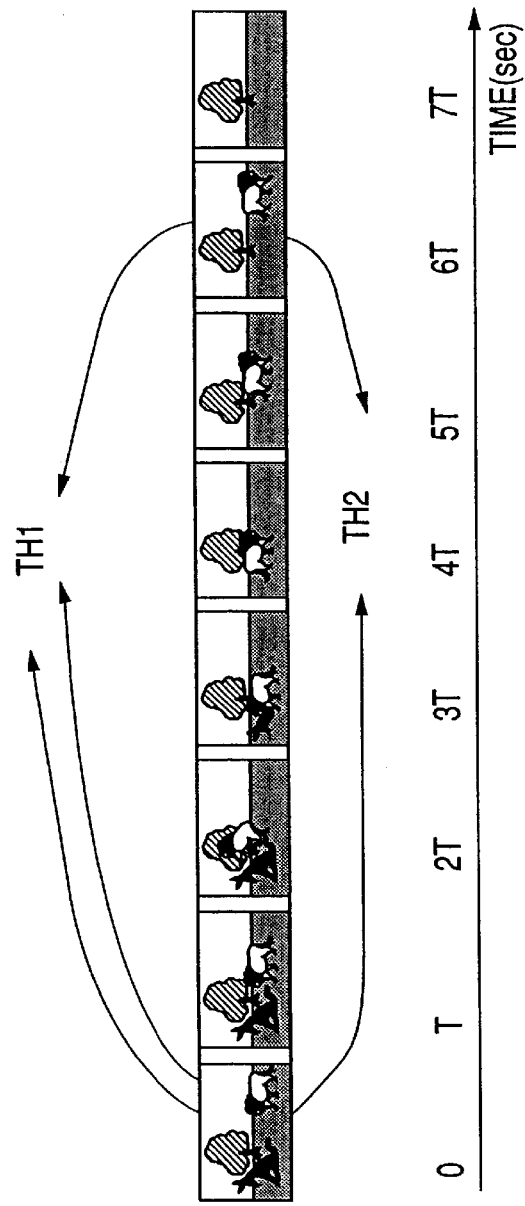
FIG. 29 is a diagram showing how frames are returned to the threads in response to the requests issued as shown in FIG. 23 in an allocation state of FIG. 28.

If, for example, the threads TH1 and TH2 issue requests at the timing as shown in FIG. 23 when slices are allocated as shown in FIG. 26, then since the vacant period of FIG. 26 is in the range from 101 to 300 ms, the value of SI is set to 1 sec. As a result, the data read subroutine returns frames to the requesting threads as shown in FIG. 27. Similarly, if the threads issue requests at the timing as shown in FIG. 23 when slices are allocated as shown in FIG. 28, then SI is set to 3 sec., resulting in returning frames as shown in FIG. 29.

Though in the above embodiment, the sharable interval SI has changed depending on the load of CPU 100, i.e., the length of vacant period, the sharable interval SI may be set to a constant value, say, 1 sec. In this case, the step 350 is omitted.

Client Terminal

Each time a client terminal 30 receives a frame, the terminal 30 preferably stores the frame number and the received time or the current time so hat the terminal 30 can display the received frames in the same timing as they were received.

It is assumed that the multimedia server 1 transmits frames of the multimedia application M1 in the timing shown in FIG. 30. For the sake of simplicity, only frames of M1 are shown in FIG. 30. It is also assumed that the frames transmitted from the server 1 reaches a destination client 30 in the same timing as the transmission timing.

Figure 32:
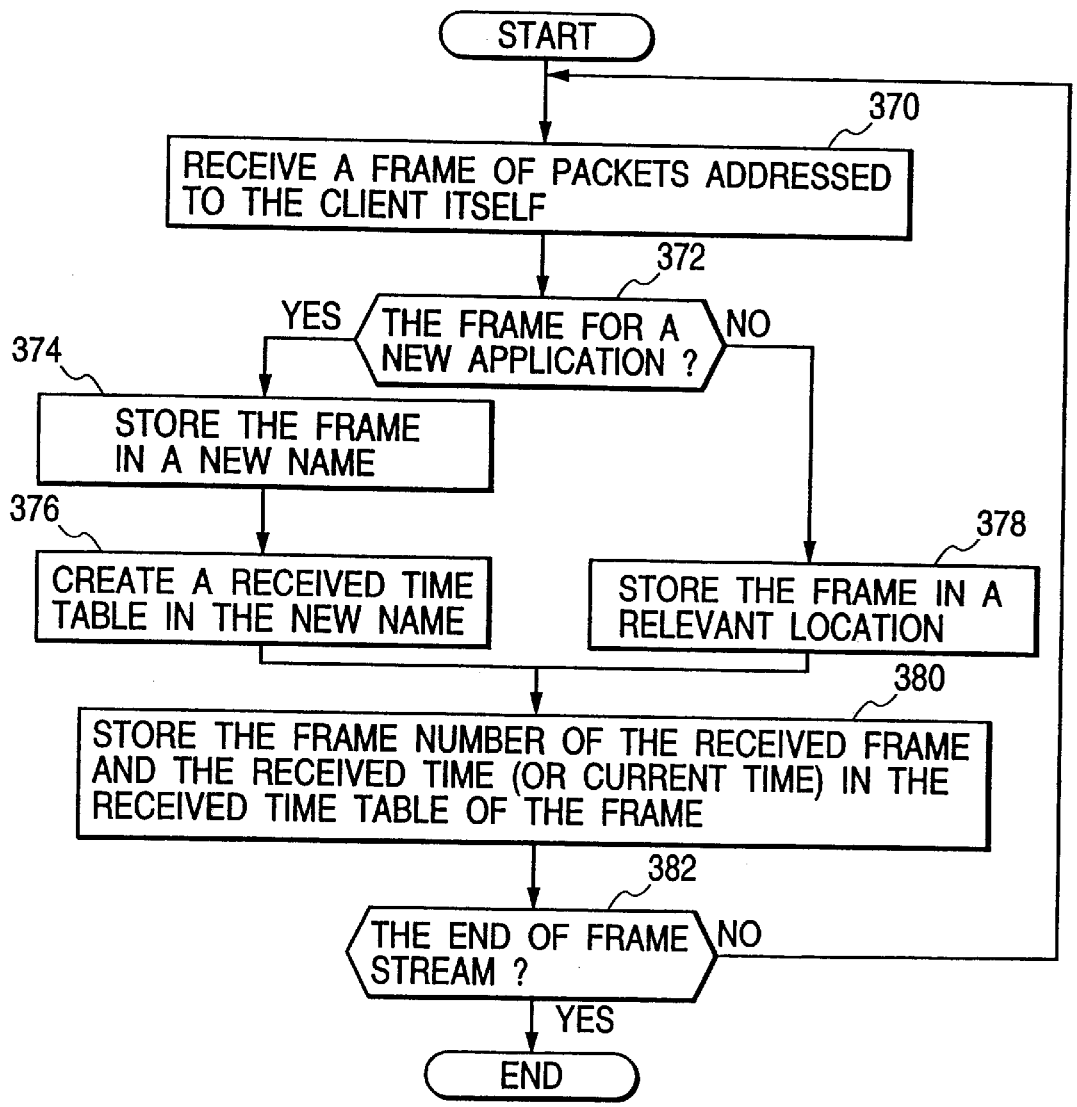
FIG. 32 is a flow chart showing an exemplary receiving operation executed by a CPU of a client 30 when the client receives a frame addressed thereto through the IF 31.

FIG. 32 is a flow chart showing an exemplary reception operation executed by a CPU 33 of a client 30 when the client receives a frame addressed to the client through the IF 31. In step 370, CPU 33 receives a frame of packets addressed to the client. In step 372, CPU 33 makes a test to see if the received frame is one of a new application. If so, then CPU 33 stores the frame in a new name in step 374 and creates a received time table in the new name in step 376. Otherwise, CPU 33 stores the frame in a relevant location in step 378. After step 376 or 378, CPU 33 stores the frame number of the received frame and the received time (or the current time) in the received time table of the received frame in step 380. In step 382, CPU 33 makes a test to see if the frame is the end of frame stream (i.e., the last frame of an application). If not, CPU 33 returns to step 370. If so, then CPU 33 ends the reception operation.

Figure 33:
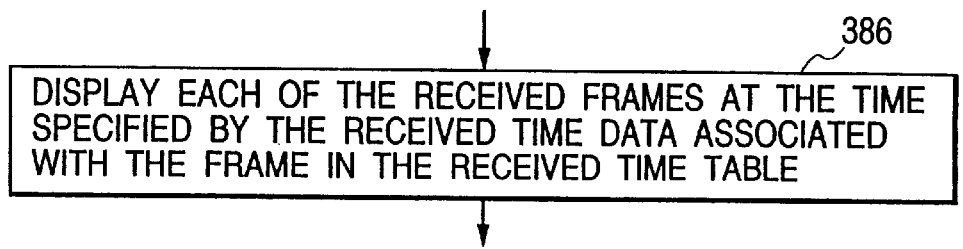
FIG. 33 is a flow chart showing a part of a display operation of the client 30.

If a user requests the client 30 to display one of multimedia applications stored in a just-described manner, the client 30 operates as shown in FIG. 33. Specifically, in step 386 of FIG. 33, CPU 33 displays each of the frames of the requested application at the time specified by the received time data associated with the frame in the received time table of FIG. 31. Doing this enables a correct reproduction of a time series data.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for transmitting multimedia applications including a video and an audio at respective adapted transfer rates in a server connected with a network wherein the server operates on an operating system which permits a multi-threading by allocating time slices to thread, the method comprising the steps of;

for each application, preparing data on a required transfer rate indicative of a permitted lowest transfer rate for the application;

generating threads for respective applications;

allocating an initial number of slices to each thread to let said treads transmit said respective applications;

measuring a transfer rate of each thread at a time interval;

calculating a number of slices to be allocated to each thread such that the measured transfer rate of each thread (i.e., each application) becomes equal to said required transfer rate of the application transmitted by the thread; and allocating said calculated number of slices to each thread.

2. A method as defined in claim 1, wherein said calculating step comprises the step of calculating a number of slices by multiplying a current number of slices allocated to each thread by a ratio of said required transfer rate to said measured transfer rate.

3. A method as defined in claim 1, further comprising the step of, in response to a detection of a synchronism among said applications, temporarily allocating a corrected number of slices to each thread such that said applications have been synchronized by the end of a subsequent time interval.

4. A method as defined in claim 1, further comprising the steps of, in response to a detection of a decrease in a total of said measured transfer rates, allocating less slices to applications of lower priorities and more slices to an application of a higher priority.

5. A method as defined in claim 4, wherein said step of allocating less slices to applications of lower priorities comprises the steps of;

calculating an amount of reduction in said less slices by using a coefficient; and in response to a result of said step of allocating less slices to applications of lower priorities, changing a value of said coefficient so that a difference between said required transfer rate and said measured transfer rate of said application of said higher priority becomes zero.

6. A method as defined in claim 1, further comprising the step of, in response to a detection that a total of said measured transfer rates exceeds a predetermined value, reducing said total of said measured transfer rates to a percentage associated with said total of said measured transfer rates.

7. A method for transmitting data to a plurality of destinations in a server connected with a network wherein the server operates on an operating system which permits a multithreading by allocating time slices to thread, the method comprising the steps of;

creating a thread to each destination; and in response to a request from one of said thread, returning a unit of data to be preferably transmitted at a time of said request, wherein said step of returning a unit of data includes the step of:

in response to a detection that a difference between said time of said request and a time of last request from a thread different from the requesting thread is smaller than a value associated with an unoccupied period of a central processing unit of the server, returning a same unit of data as returned at said time of last request.

8. A method as defined in claim 7, further comprising the step of selecting a predetermined constant value for said value.

9. A method as defined in claim 1, further comprising the steps, executed by a client connected with the network, of:

receiving and storing a unit of data addressed to said client;

storing a unit ID of said received unit and a received time; and displaying a stored unit of data of said unit ID according to said received time.

10. A server for transmitting multimedia applications including a video and an audio at respective adapted transfer rates in a server connected with a network wherein the server operates on an operating system which permits a multi-threading by allocating time slices to thread, the server comprising:

means for preparing data on a required transfer rate indicative of a permitted lowest transfer rate for the application;

means for generating threads for respective applications;

means for allocating an initial number of slices to each thread to let said threads transmit said respective applications;

means for measuring a transfer rate of each thread at a time, interval;

means for calculating a number of slices to be allocated to each tread such that the measured transfer rate of each thread (i.e., each application) becomes equal to said required transfer rate of the application transmitted by the thread; and means for allocating said calculated number of slices to each thread.

* * * * *